United States Patent Office 3,535,264
Patented Oct. 20, 1970

3,535,264
PRODUCTION OF SPHERICAL OXIDIC OR CARBIDIC PARTICLES FROM HEAVY METAL SALT SOLUTIONS
Karl-Gerhard Hackstein and Gerhard Fleischhauer, Hanau am Main, and Jurgen Nowak, Neuenhasslau, Germany, assignors to Nukem Nuklear-Chemie und-Metallurgie Gesellschaft m.b.H., Wolfgang, near Hanau am Main, and Kernforschungsanlage Julich des Landes Nordrhein-Westfalen e.V., Julich, Germany
No Drawing. Filed July 5, 1967, Ser. No. 651,141
Claims priority, application Germany, July 6, 1966, 1,542,346
Int. Cl. G21c 3/04
U.S. Cl. 252—301.1                         10 Claims

ABSTRACT OF THE DISCLOSURE

Process for production of highly dense oxidic or carbidic particles from metal salt solutions, preferably, those of uranyl and/or thorium salts, which form solid compounds when introduced into aqueous alkaline precipitating baths by emulsifying the aqueous salt solution with an oil, if desired, with addition of a binding agent, introducing the emulsion in droplet form into an aqueous alkaline precipitation bath to produce solid spheres which are dried and sintered to produce the desired dense particles. When carbidic particles are desired, finely divided carbon is also suspended in the emulsion whereby carbidic particles are formed during sintering.

BACKGROUND OF THE INVENTION

The invention relates to a process for the production of spherical oxidic or carbidic particles from heavy metal salt solutions.

In recent times, spherical and highly dense oxidic or carbidic particles of uranium and/or thorium or plutonium are becoming increasingly important. They can be used either as fuels for high temperature nuclear reactors in the form of coated particles or they can be used in vibration compacted fuel elements.

Powder metallurgy processes have primarily been used in the preparation of such particles. However, in view of the reprocessing of spent nuclear fuel, chemical procedures for the preparation of the particles are more advantageous as the solutions produced can be directly processed further.

SUMMARY OF THE INVENTION

According to the invention a simple process is provided for the production of highly dense oxidic or carbidic particles directly from metal salt solutions, preferably those of uranium and/or thorium, wherein the aqueous metal salt solution is emulsified with an oil with the aid of an emulsifier and thereby split up into extremely fine droplets and, if desired, after addition of a binding agent, such emulsion is introduced in the form of droplets into an alkaline medium whereby solid spheres are produced (gelation) which are dried and sintered. When carbidic particles are desired, graphite or carbon black is also suspended in the emulsion before it is introduced to the alkaline medium.

DETAILED DESCRIPTION OF THE INVENTION INCLUDING PREFERRED EMBODIMENTS

The process according to the invention is especially suited for the treatment of aqueous nitrate solutions of hexavalent uranium but also is suited for treatment of other aqueous solutions of metal salts which form solid compounds when introduced into an alkaline media, such as, for instance, zirconium or aluminum. The salts employed may, for example, be the chlorides, oxychlorides, fluorides or nitrates. Mineral or vegetable oils, such as, for example, paraffin oil or caster oil, as well as silicone oil, can be used in the preparation of the emulsions employed according to the invention. Polyvinyl alcohol, methyl cellulose, vegetable gums, such as gum arabic which can be volatilized at moderate temperatures, for instance, can be employed as the binding agents. Ammonia is preferably employed as the alkaline medium but in some instances aqueous solutions of alkali metal hydroxides can be used, such, as, for instance, in the production of zirconium oxide particles. As to the emulsifiers, it is, of course, necessary that they be compatible with the salts and alkaline media concerned. As a consequence, non-ionic emulsifiers are preferred, such as, for example, the polyoxyethylene esters of higher fatty acids, the alkyl phenyl polyethylene glycol ethers and polyoxyethylated fatty alcohols.

The droplet size of the emulsion which is introduced into the alkaline medium for the production of the solid gelled spheres can, for instance, be preferably varied between 100 and 5000$\mu$.

When the droplets of the emulsion are introduced into the aqueous alkaline precipitating bath, the complete gelation of such droplets is easily attained in that the alkaline medium, such as, for example, ammonia, can quickly and completely penetrate macroscopic emulsion droplets along the phase boundaries of the extremely finely divided suspended droplets in the emulsion. In view of the extremely short diffusion path provided, immediate precipitation of, for example, the solid uranium compound is effected in the suspended droplets. These primary uranium compound particles cross-link with each other and form solid particles almost immediately, especially in the presence of a binding agent. At the same time and while the precipitated particles remain in the precipitating bath, a wash out of the salt formed by reaction of the alkali with a metal salt, such as, for example, ammonium nitrate, commences. When the solidified particles are dried, they yield the major portion of the oil with simultaneous shrinkage. The oil can be removed, for example, by washing with $CCl_4$.

The quantity of metal salt contained in the emulsion introduced into the precipitating bath preferably is such as to provide 50 to 250 g. and expediently about 100 g. metal per liter of emulsion.

The following examples will serve to illustrate the process of the invention.

Example 1

570 ml. of an aqueous uranyl nitrate solution (350 g. U/liter) were emulsified with 400 ml. of paraffin oil (d=0.840) after addition of 30 ml. of a non-ionic emulsifier (trimethylolpropyl-oleat-ethoxylate with 6 groups of ethylene oxide). Thereafter 1 liter of a 5% aqueous solution of polyvinyl alcohol (mol. wt. 130–150,000, remaining unsaponified acetyl groups 0–2%) was stirred in and the mixture (100 g. U/liter; 25 g. PVA/liter) sprayed into a 25% aqueous ammonia solution in the form of droplets. The freshly gelled particles were separated off and air dried. During such air drying the main quantity of the oil contained therein was set free with simultaneous shrinking of the particles. They were then washed in $CCl_4$ to remove the oil residue and then carefully dried at 300° C. and then calcined at 1000° C. to remove the PVA and subsequently sintered for 2 hours in a reducing $H_2$ atmosphere. The density of the resulting $UO_2$ particles was 98% of theory.

Analogous results were obtained when the 400 ml. of paraffin oil were replaced by 400 ml. of caster oil or 350 ml. of silicone oil. Analogous results were also obtained when the PVA solution was replaced with 1 liter of a 2% methyl cellulose solution or 0.8 liter of a 10% gum arabic solution.

Example 2

The procedure of Example 1 was repeated except that a mixed uranyl thorium nitrate solution was used instead of the uranyl nitrate solution so as to provide an emulsion containing 100 g. of U/Th per liter, 25 g. PVA per liter and a U:Th ratio of 1:10 and that a sintering temperature of 1150° C. was used. The resulting $(U/Th)O_2$ particles had a density which was 95% of theory.

Example 3

The procedure of Example 2 was again repeated except that 21 g. of finely divided graphite were also suspended in the emulsion and a nitrogen atmosphere was used for the calcination and the sintering was carried out at 1800° C. to effect simultaneous sintering and conversion of the particles to U/Th carbide particles.

Example 4

An emulsion prepared as described in Example 1 from an aqueous zirconyl chloride solution, paraffin oil and the emulsifier and after mixture with the PVA solution the mixture was introduced in droplet form into an aqueous 10% NaOH solution. The resulting freshly gelled spherical particles were washed and dried in air and then sintered at 1400° C. to dense $ZrO_2$ particles.

Example 5

An emulsion prepared as described in Example 1 from an aqueous aluminum hydroxy chloride solution, paraffin oil and the emulsifier and after mixture with the PVA solution the mixture (50 g. Al/liter and 25 g. PVA/liter) was introduced in droplet form into an aqueous 10% NaOH solution. The resulting freshly gelled spherical particles were washed and dried in air and then sintered at 1400° C. to dense $Al_2O_3$ particles.

1. In a method for the production of spherical particles of a material selected from the group consisting of metal oxides and metal carbides from aqueous metal salt solutions, said metal being selected from the group consisting of uranium, thorium, zirconium and aluminum, the steps of forming an emulsion of an aqueous solution of a salt of said metal which precipitates a solid compound when introduced into aqueous alkaline media, and an oil and introducing said emulsion into an aqueous alkaline precipitating bath in the form of droplets to solidify such emulsion into completely reacted homogeneous particles.

2. The method of claim 1 in which said aqueous alkaline precipitating bath is selected from the group consisting of aqueous ammonia and aqueous alkali metal hydroxide solution.

3. The method of claim 2 in which said emulsion contains an aqueous solution of a binding agent for the particles formed.

4. The method of claim 3 in which said binding agent is selected from the group consisting of polyvinyl alcohol, methyl cellulose and vegetable gums.

5. The method of claim 1 in which said aqueous metal salt solution is an aqueous solution of at least one nitrate selected from the group consisting of uranyl and thorium nitrates.

6. The method of claim 1 in which the concentration of the metal salt in the emulsion is such as to provide between 50 and 250 g./liter of metal in said emulsion.

7. The process of claim 1 in which the solid particles formed in said aqueous alkaline bath are washed, dried and sintered to form dense particles.

8. The process of claim 1 in which finely divided carbon selected from the group consisting of graphite and carbon black is suspended in said emulsion before it is introduced into the aqueous alkaline precipitating bath and the solid particles formed in said aqueous alkaline bath are washed, dried and sintered to form dense carbide particles, the quantity of carbon suspended in the emulsion being sufficient for the carbide formation.

9. The method according to claim 1 wherein a nonionic emulsifier is added to the aqueous salt solution prior to introducing the emulsion into the aqueous alkaline precipitating bath.

10. A method according to claim 1 wherein the metal salt is a salt of a metal selected from the group consisting of uranium, thorium and zirconium.

References Cited

UNITED STATES PATENTS

| 3,320,179 | 5/1967 | Gens | 252—301.1 |
| 3,331,783 | 7/1967 | Braun et al. | 252—301.1 |
| 3,345,437 | 10/1967 | Flack et al. | 252—301.1 X |
| 3,384,687 | 5/1968 | Flack et al. | 264—.5 |
| 3,397,257 | 8/1968 | Brambilla et al. | 264—.5 |

CARL D. QUARFORTH, Primary Examiner

M. J. SCOLNICK, Assistant Examiner

U.S. Cl. X.R.

264—.5; 23—345, 349, 354, 208, 140, 143